(12) United States Patent
Haruyama

(10) Patent No.: US 6,684,085 B1
(45) Date of Patent: Jan. 27, 2004

(54) MOBILE TELEPHONE AND ANTENNA THEREFOR

(75) Inventor: Shinichi Haruyama, Yokohama (JP)

(73) Assignee: Samsung Electronics Co., Ltd., Gyeonggi-do (KR)

(*) Notice: Subject to any disclaimer, the term of this patent is extended or adjusted under 35 U.S.C. 154(b) by 438 days.

(21) Appl. No.: 09/651,774

(22) Filed: Aug. 30, 2000

(30) Foreign Application Priority Data

Aug. 31, 1999 (JP) .......................... 11-246434

(51) Int. Cl.⁷ ................................. H04B 1/38
(52) U.S. Cl. .................. 455/562; 455/82; 455/121; 343/702
(58) Field of Search .................. 455/562, 89, 90, 455/82, 561, 575, 121, 550, 269, 274, 129; 343/702, 792, 901, 791, 883, 878, 900–903, 876, 907, 795, 860

(56) References Cited

U.S. PATENT DOCUMENTS

| | | | | |
|---|---|---|---|---|
| 4,012,744 A | * | 3/1977 | Greiser ........................ 343/895 |
| 4,114,164 A | * | 9/1978 | Greiser ........................ 343/895 |
| 5,450,093 A | * | 9/1995 | Kim ............................ 343/895 |
| 5,541,609 A | * | 7/1996 | Stutzman et al. ........... 343/702 |
| 5,854,608 A | * | 12/1998 | Leisten ....................... 343/895 |
| 6,414,638 B1 | * | 7/2002 | Egashira ..................... 343/702 |
| 2002/0008663 A1 | * | 1/2002 | Sugura et al. .............. 343/700 |

FOREIGN PATENT DOCUMENTS

| | | | | |
|---|---|---|---|---|
| JP | 09-284831 | | 10/1997 | |
| JP | 10-013124 | * | 1/1998 | ............ H01Q/1/24 |

* cited by examiner

Primary Examiner—Edward F. Urban
Assistant Examiner—C. Chow
(74) Attorney, Agent, or Firm—Cha & Reiter, LLC.

(57) ABSTRACT

An antenna for a mobile telephone, in which a radiation source of the antenna is separated from the user's head while the mobile telephone is in use, to prevent an influence of the radiation waves on the user's head and prevent the non-directional property of the radiation pattern from being degraded. The mobile telephone comprises an antenna body for transmitting and receiving radio waves; a terminal for performing communication based on the radio waves transmitted and received by the antenna body; and a support for maintaining (or supporting) the antenna body to be higher by a predetermined height than the terminal, when the mobile telephone is in use.

13 Claims, 5 Drawing Sheets

MOBILE TELEPHONE AND ANTENNA THEREFOR

CLAIM OF PRIORITY

This application claims priority to an application entitled "Mobile Telephone and Antenna therefor" filed in the Japanese Patent Office on Aug. 31, 1999 and assigned Serial No. 11-246434.

BACKGROUND OF THE INVENTION

1. Field of the Invention

The present invention relates generally to an antenna for a mobile telephone. In particular, the present invention relates to the structure of a small antenna for use in a mobile telephone.

2. Description of the Related Art

It is known in the art to provide a mobile telephone with either of two types of antennas to transmit and receive radio signals. The first type of antenna is referred to in the art as a $\lambda/2$ type linear antenna (or a half-wavelength antenna), and the second type of antenna is known as an axial mode helical antenna. The helical antenna is made by helically reducing the length of the linear antenna used for an antenna of a mobile telephone. FIGS. 5A and 5B are diagrams illustrating an exterior view of a general mobile telephone.

For example, FIG. 5A illustrates a mobile telephone that has a $\lambda/2$ type linear antenna, and FIG. 5B illustrates a mobile telephone that has a helical antenna. In FIG. 5A, a $\lambda/2$ type linear antenna 42 mounted on a mobile telephone 41 resonates at a designated frequency to generate a vertically polarized plane wave. This antenna structure makes it possible to obtain a non-directional radiation pattern on the vertical plane.

FIG. 6 illustrates a current distribution of the $\lambda/2$ type linear antenna 42. It is clear that the resonant current is concentrated (largest) in the central area of the $\lambda/2$ type linear antenna.

Additionally, the current distribution (radiation pattern) of a helical antenna 44 shown in FIG. 5B, which is mounted on a mobile telephone 43, is equal to that of the $\lambda/2$ type linear antenna shown in FIG. 6. However, the helical antenna 44 is smaller in length than the $\lambda/2$ type linear antenna 42, which makes the helical antenna 44 a more popular choice in mobile telephones than the $\lambda/2$ type linear antenna.

Japanese patent publication No. 7-46026, discloses in detail a small-sized helical antenna, and the contents of this publication should be referred as background material. This helical antenna includes a reflecting plate formed by sequentially disposing a dielectric plate and a strip conductor on a conductive substrate, and the reflecting plate is attached to one end of a helical coil.

For impedance matching, the proper width and length of the conductive substrate and the proper material and thickness of the dielectric plate are selected, thereby to realize the helical antenna which is further reduced in size and has higher performance.

However, when the mobile telephone with the $\lambda/2$ type linear antenna or the helical antenna is operational, the resonant current point shown in FIG. 6 radiates near the head of the user.

FIG. 7 illustrates a state where the user holds the mobile telephone with the conventional $\lambda/2$ type linear antenna to his/her ear. Although the $\lambda/2$ type linear antenna and the helical antenna have slightly different resonant current points, a radiation source 53 is formed near the user's head 52 when the user holds the mobile telephone 51 to his ear, which exerts radiation waves on the head 52. Recent studies have indicated that the radiation, particularly the transmission from the mobile telephone, may penetrate as much as three inches inside the skull, bombarding a portion of the user's brain with radiation.

Though not proven, there is an increased concern that the transmission and reception waves of the mobile telephone could exert a harmful influence on the human body. In particular, although not shown in any studies, some researchers are suggesting that long term exposure to the head could affect memory and possibly increase the risk of brain tumors. Accordingly, it is preferable that the radiation source of the antenna should be separated far as possible from the human body as far as possible.

In addition, the non-directional property of the antenna can be degraded when the radiation source of the antenna is formed close to the user's head because the skull interferes with the radiation.

FIGS. 8A and 8B illustrate radiation patterns of the $\lambda/2$ type linear antenna. Specifically, FIG. 8A illustrates the original radiation pattern of the antenna, and FIG. 8B illustrates a radiation pattern affected by the user's head. That is, FIG. 8A shows a radiation source 61 of the $\lambda/2$ type linear antenna, which is non-directional on the vertical plane, when the mobile telephone is transmitting or receiving.

As shown in FIG. 8B, since the antenna is so close to the user's head 62, the head actually functions as a reflecting substance, so that the radio waves will not be radiated to the opposite direction of the head 62. Therefore, the original non-directional property of the antenna, as shown in FIG. 8A, is changed to the directional property shown in FIG. 8B, thus degrading the communication quality.

SUMMARY OF THE INVENTION

It is, therefore, an object of the present invention to provide an antenna for a mobile telephone, in which a radiation source of the antenna is separated from the user's head while the mobile telephone is in use, in order to prevent an influence of the radiation waves on the head and prevent the non-directional property of the radiation pattern from being degraded.

To achieve the above and other objects, a mobile telephone according to the present invention comprises an antenna body for transmitting and receiving radio waves; a terminal for performing communication based on the radio waves transmitted and received by the antenna body; and, a support for maintaining (or supporting) the antenna body to be higher by a predetermined height than the terminal. In this manner, it is possible to improve the directional property of the antenna.

Preferably, the antenna body comprises a cylindrical or circular column-type dielectric substance, and an antenna conductor including a radiation section for radiating the radio waves, which is formed on the longitudinal surface of the dielectric substance. In addition, impedance matching sections are formed on the top and bottom surfaces of the dielectric substance. The antenna body is fixed to be higher than the terminal by a predetermined height when the mobile telephone is in use. That is, by attaching the radiation section of the antenna conductor to the cylindrical or circular column-type dielectric substance, it is possible to provide a very small antenna by the action of the dielectric. Therefore, it is possible to form a radiation source, which is close to the point, and provide a good non-directional property.

Preferably, the antenna body has a specific length such that the transmission and reception waves resonate with the half wavelength ($\lambda/2$), and the radiation section is formed at the center of the antenna body and is fixed in a longitudinal direction of the dielectric substance. In this manner, it is possible to make a very small antenna of about 10 mm.

Preferably, the antenna body is attached to the terminal such that the antenna body should be higher than the top of the user's head, when the mobile telephone is in use. In this structure, the user's head is not affected by the radiation waves, and the user's head does not block radiation of the radio waves, thus preventing degradation of the directional property of the radiation waves. Since the human body is not in the path of the resonant current point of the radio waves of the antenna, it is possible to provide a mobile telephone, which is more safe and sanitary than known in the prior art.

Preferably, the antenna conductor is formed on the dielectric substance by forming a wire pattern by etching, printing or firing. In this way, it is possible to increase productivity and decrease the cost.

Preferably, the dielectric substance is a ceramic. Although inorganic material may also be used for the dielectric substance, it is possible to facilitate evaporation of the antenna conductor and increase the productivity by using the ceramic.

In addition, a rod can be used between a terminal for performing communication based on the radio waves transmitted and received, and that of the antenna body, so that at least during the operation of the mobile telephone by the user, the antenna body is higher than the terminal by a predetermined height. This rod may be a non-radiating and/or non-conductive type of rod. It may be hollow and, for example, a coaxial cable or other conductive material can be arranged therein (or coated in a portion of the interior of the rod, in order to provide a conductive path between the terminal and the antenna body, so that the user's head does not interfere with the radiation pattern of the antenna.

Further, an antenna for use in a mobile telephone according to the present invention comprises an antenna body of the antenna. The antenna body includes a cylindrical or circular column-type dielectric; and an antenna conductor including a radiation section for radiating the radio waves, formed on the longitudinal surface of the dielectric substance, and impedance matching sections formed on the top and bottom surfaces of the dielectric substance. The antenna body also has a specific length such that transmission and reception waves resonate with the half wavelength ($\lambda/2$), and the radiation section is formed at the center of the antenna body and is fixed in a longitudinal direction of the dielectric substance.

That is, by attaching the radiation section of the antenna conductor to the cylindrical or circular column-type dielectric substance, it is possible to provide a very small antenna by the action of the dielectric. Therefore, it is possible to form a radiation source, which is close to the point, and provide a good non-directional property.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
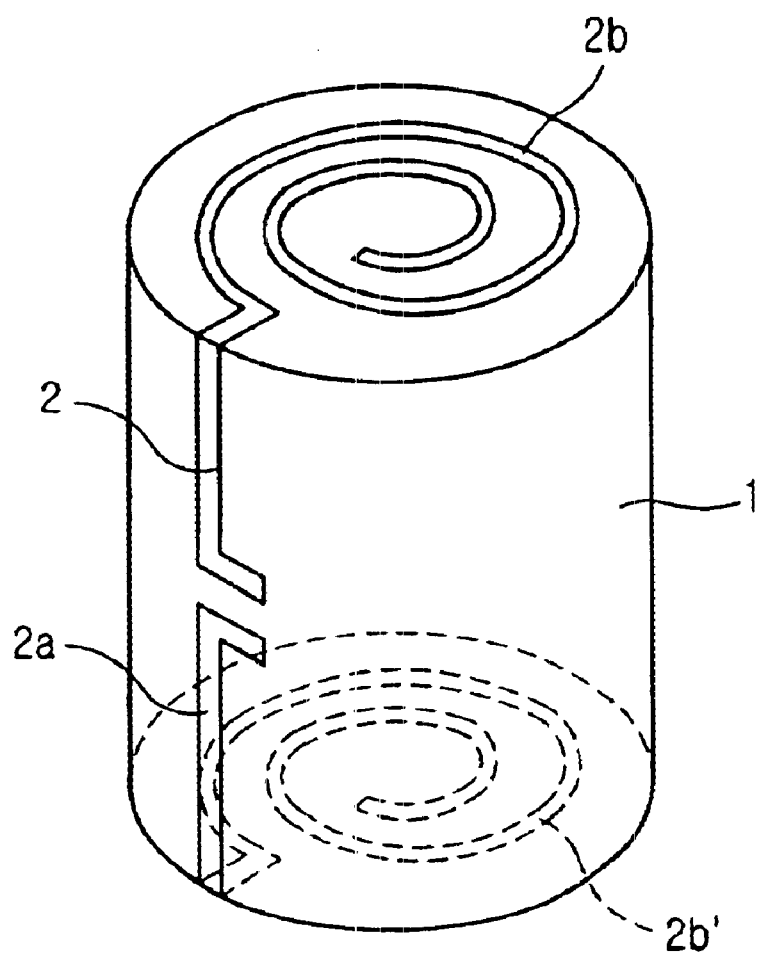
FIG. 1 is a diagram illustrating an exterior view of a small antenna for use in a mobile telephone according to the embodiment of the present invention.

FIG. 1 illustrates an exterior view of a small antenna for use in a mobile telephone according to the embodiment of the present invention. The small antenna includes an antenna conductor 2, which is attached on the external, longitudinal surface and the top and bottom surfaces of the cylindrical dielectric ceramic 1. The antenna conductor 2 includes a radiation section 2*a* comprised of a print pattern which is longitudinally formed along the surface of the dielectric ceramic 1, and impedance matching sections 2*b* and 2*b'*, each comprised of a print pattern which is spirally formed on the top and bottom surfaces of the dielectric ceramic 1.

The dielectric ceramic 1 has a length of about 10 mm and a diameter of 8 mm. The longitudinally formed radiation section 2*a* is positioned at the center of the conductor, which resonates with $\lambda/2$, so that the current is concentrated, thus radiating the vertical polarized plane waves at higher efficiency. In addition, two terminals of the radiation section 2*a*, formed at the center thereof, are electrically connected to the mobile telephone, which is a load, through a non-depicted feeding part of the impedance matching sections.

Meanwhile, the impedance matching sections 2*b* and 2*b'*, which are spirally formed on the top and bottom surfaces of the dielectric ceramic 1, are spirally wound given times in concentricity with the circumference of the dielectric ceramic 1, so that it resonates with the total electrical length of about $\lambda/2$, providing a good input impedance. In addition, the impedance matching sections 2*b* and 2*b'* formed on the top and bottom surfaces of the dielectric ceramic 1 do not contribute to the radiation.

By forming the antenna conductor on the dielectric ceramic as shown in FIG. 1, it is possible to realize a very small antenna, because the radiation source is close to a point by the action of dielectric.

In addition, although the invention has been described with reference to the embodiment in which the ceramic is used for the dielectric substance, it is also possible to use quartz glass, lithium niobate or another organic material for the dielectric substance. For example, it is possible to use the dielectric material such as polyester, which has a low high-frequency loss, or ebonite or paraffin.

Figure 2:
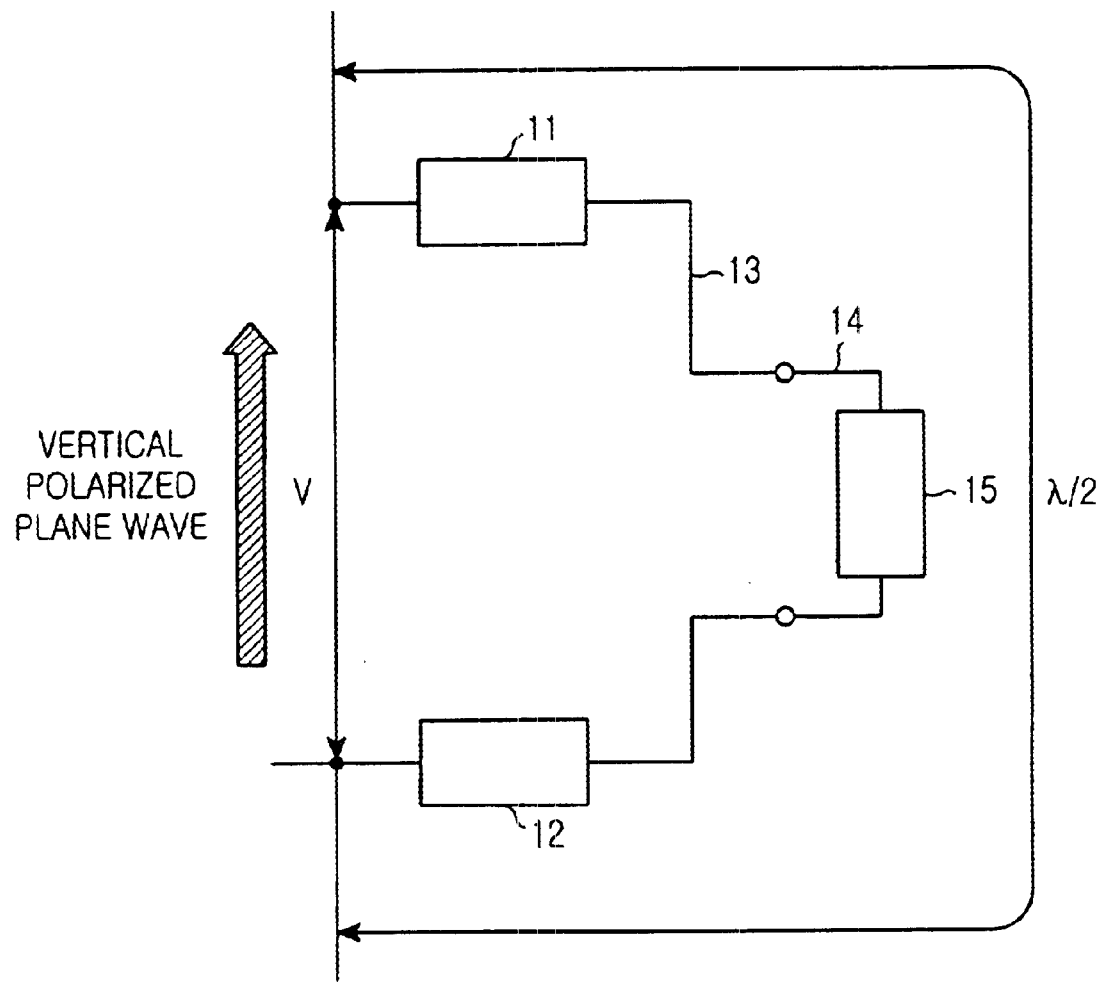
FIG. 2 is an equivalent diagram of the small antenna of FIG. 1.

FIG. 2 illustrates an equivalent diagram of the small antenna for use in a mobile telephone, shown in FIG. 1. A $\lambda/2$ type linear antenna 13 having matched impedances 11 and 12 at both ends thereof, is connected to a mobile telephone load 15 at the central terminals thereof, through a balance/unbalance matching circuit and a 50 Ω coaxial cable 14, and the total length of the linear antenna 13 is $\lambda/2$. The balance/unbalance matching circuit refers to a circuit for matching a balanced circuit such as a dipole antenna with an unbalanced circuit such as a coaxial cable. A voltage V occurs at both ends of the antenna 13 by an arrival wave (or vertically polarized plane wave) from the exterior, causing a current flow through the antenna. In addition, the matched impedances 11 and 12 are impedance-matched with the coaxial cable 14.

Figure 3:
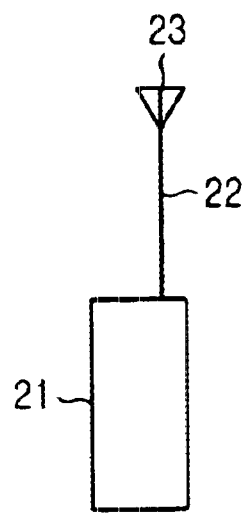
FIG. 3 is a diagram illustrating a mobile telephone with a small antenna of FIG. 1.

FIG. 3 illustrates a mobile telephone with the small antenna of FIG. 1. The small antenna 23 of FIG. 1 is attached to the top area of the rod 22, which defines the physical height of the antenna for a mobile telephone 21. Since the rod 22 is used to maintain the height of the small antenna 23, it is not necessary for the rod 22 to be made of material serving as an antenna. It is merely preferable that the rod 22 should be retractable when it is not in use. Further, the small antenna 23 is connected to the mobile telephone 21 by a non-depicted coaxial cable through the rod 22.

Preferably, the rod 22 has a specific length such that the small antenna 23 should be slightly higher than the head, when the user holds the mobile telephone 21 to his or her ear.

Figure 4:
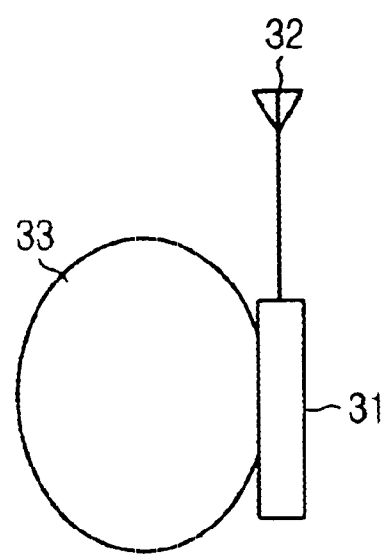
FIG. 4 is a diagram illustrating a state where the user holds the mobile telephone of FIG. 3 to his ear.
Figure 5:
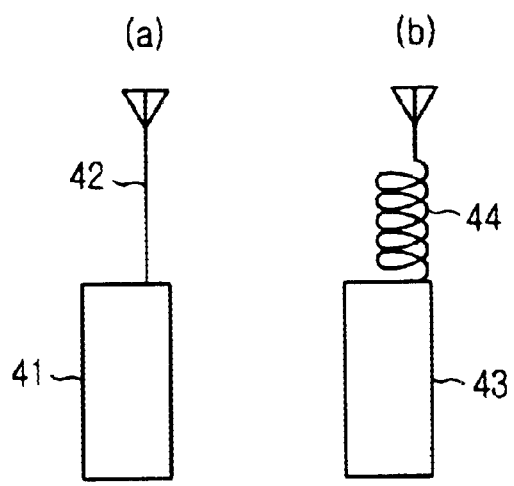
FIG. 5A is a diagram illustrating a general mobile telephone with a $\lambda/2$ type linear antenna.
FIG. 5B is a diagram illustrating a general mobile telephone with a helical antenna.
Figure 6:
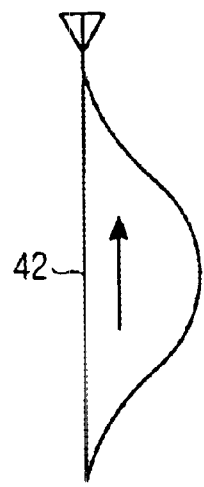
FIG. 6 is a diagram illustrating current distribution of the $\lambda/2$ type linear antenna.
Figure 7:
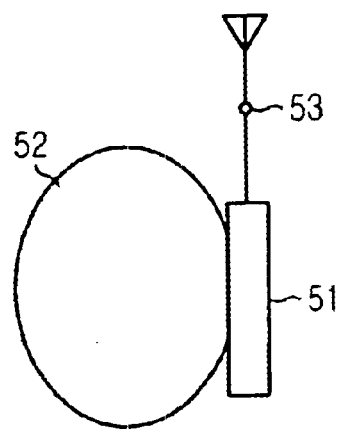
FIG. 7 is a diagram illustrating a state where the user holds the mobile telephone with the conventional $\lambda/2$ type linear antenna to his ear.
Figure 8:
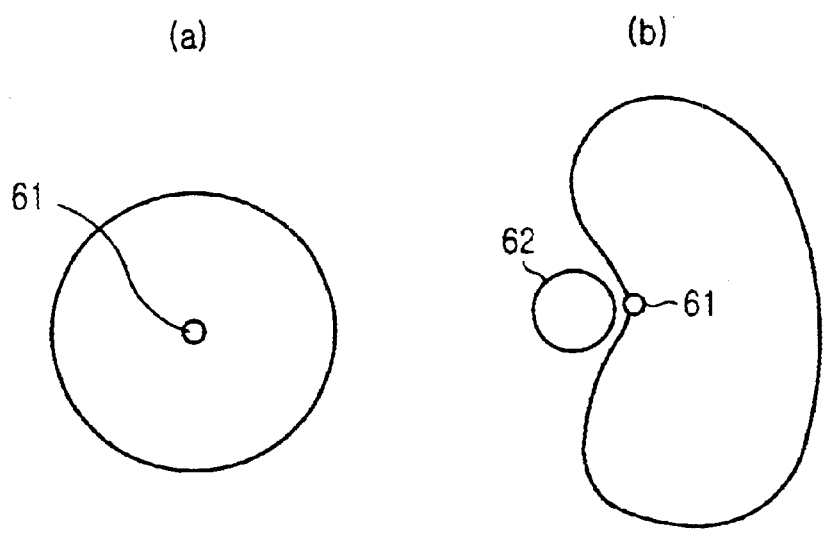
FIG. 8A is a diagram illustrating an original radiation pattern of the $\lambda/2$ type linear antenna; and, FIG. 8B is a diagram illustrating a radiation pattern affected by the user's head.

FIG. 4 illustrates a state where the user holds the mobile telephone of FIG. 3 to his ear. When the user holds the mobile telephone 31 to his ear, a radiation source 32 of the antenna is positioned to be higher than the top of the user's head 33, and the transmission and reception waves of the mobile telephone 31 in operation are radiated in the horizontal direction, thus reducing radiation of the radio waves to the user's head 33. In addition, since the radiation of the radio waves is not blocked by the head 33, the non-directional radiation property may be maintained. In particular, since the small antenna is comprised of the cylindrical dielectric ceramic, it is possible to obtain the uniform radiation directional property over 360°.

As described above, in the novel small antenna having a length of about 10 mm for use in a mobile telephone, the radiation source is positioned higher than the top of the user's head, so that the user's head is not affected by radiation waves when the mobile telephone is in operation. In addition, the radiation waves are not blocked by the user's head, so that the original radiation pattern of the antenna may not affected by the user's head, thus improving the communication quality. Furthermore, since the antenna is comprised of the cylindrical dielectric substance, it is possible to obtain a good radiation directional property over 360°. In this manner, it is possible to realize a very small antenna suitable for the mobile telephone.

While the invention has been shown and described with reference to a certain preferred embodiment thereof, it will be understood by those skilled in the art that various changes in form and details may be made therein without departing from the spirit and the scope of the invention as defined by the appended claims. For example, although the cylindrical dielectric ceramic is used in the embodiment of the present invention, it is also possible to use a circular column-type dielectric ceramic. Further, the dielectric substance is not restricted to the ceramic, and another dielectric substance can also be used. In addition, the antenna conductor can be made by either attaching a conductor on the external surface of the dielectric substance or forming a conductive film on the dielectric substance by etching. In addition, by processing the dielectric ceramic, it is possible to provide an active antenna in which the balance/unbalance matching circuit and the LNA (Low Noise Amplifier) are included. In addition, the antenna may have a structure in which a conductive layer is formed on the molded dielectric resin in a given pattern.

What is claimed is:

1. A mobile telephone comprising:
   an antenna body for transmitting and receiving radio waves;
   a terminal for performing communication based on the radio waves transmitted and received by the antenna body; and
   a means for maintaining the antenna body to be higher by a predetermined height than the terminal;
   wherein the antenna body comprises:
     a cylindrical or circular column-type dielectric substance; and
     an antenna conductor including a radiation section for radiating the radio waves, formed by at least two radiation portions of approximately equal length along the longitudinal surface of the cylindrical dielectric substance, and respective impedance matching sections formed on the top and bottom surfaces of the dielectric substance, a first respective impedance matching section connected to one end of a first radiation portion and a second respective impedance matching section connected to one end of a second radiation portion of said at least two radiation portions, wherein a total length of said at least two radiation portions is equal to $\lambda/2$ wavelength;
   wherein another end of each of the first radiation portion and second radiation portion are arranged adjacent each other so as to facilitate connection to the terminal; and
   wherein the antenna body is fixed to be higher than the terminal by the predetermined height when the mobile telephone is in use.

2. The mobile telephone as claimed in claim 1, wherein the antenna body has a specific length such that the transmission and reception waves resonate with a half wavelength ($\lambda/2$), and the radiation section is formed at the center of the antenna body and is fixed in a longitudinal direction of the dielectric substance.

3. The mobile telephone as claimed in claim 2, wherein the antenna body is attached to the terminal such that the antenna body should be higher than the top of the user's head when the mobile telephone is in use.

4. The mobile telephone as claimed in claim 3, wherein the antenna conductor is formed on the dielectric substance by forming a wire pattern by etching, printing or firing.

5. The mobile telephone as claimed in claim 4, wherein the dielectric substance is a ceramic.

6. The mobile telephone as claimed in claim 1, wherein the antenna body is attached to the terminal such that the antenna body should be higher than the top of the user's head when the mobile telephone is in use.

7. The mobile telephone as claimed in claim 6, wherein the antenna conductor is formed on the dielectric substance by forming a wire pattern by etching, printing or firing.

8. The mobile telephone as claimed in claim 7, wherein the dielectric substance is a ceramic.

9. The mobile telephone as claimed in claim 1, wherein said means for maintaining the predetermined height includes a non-radiating rod arranged between the antenna body and the terminal.

10. The mobile telephone as claimed in claim 9, wherein the rod comprises a non-conductive exterior surface, and a hollow interior to provide a conduit for a conductor arranged therein.

11. The mobile telephone as claimed in claim 1, wherein said means for the antenna body maintains a predetermined height sufficient to permit the antenna ate approximately 360 degrees without interference from the user's head.

12. The mobile telephone as claimed in claim 1, wherein said antenna body radiates horizontal direction above the user's head while in use.

13. An antenna for use in a mobile telephone, comprising:
an antenna body of said antenna including;
a cylindrical or circular column-type dielectric;
an antenna conductor including a radiation section for radiating the radio waves, formed on the longitudinal surface of the dielectric substance, and impedance matching sections formed on the top and bottom surfaces of the dielectric substance; and,
wherein the antenna body has a specific length such that transmission and reception waves resonate with the half wavelength ($\lambda/2$), and the radiation section is formed at the center of the antenna body and is fixed in a longitudinal direction of the dielectric substance.

* * * * *